F. FOUARGE.
ROASTING FURNACE.
APPLICATION FILED APR. 24, 1917. RENEWED FEB. 4, 1920.

1,335,490.

Patented Mar. 30, 1920.
3 SHEETS—SHEET 1.

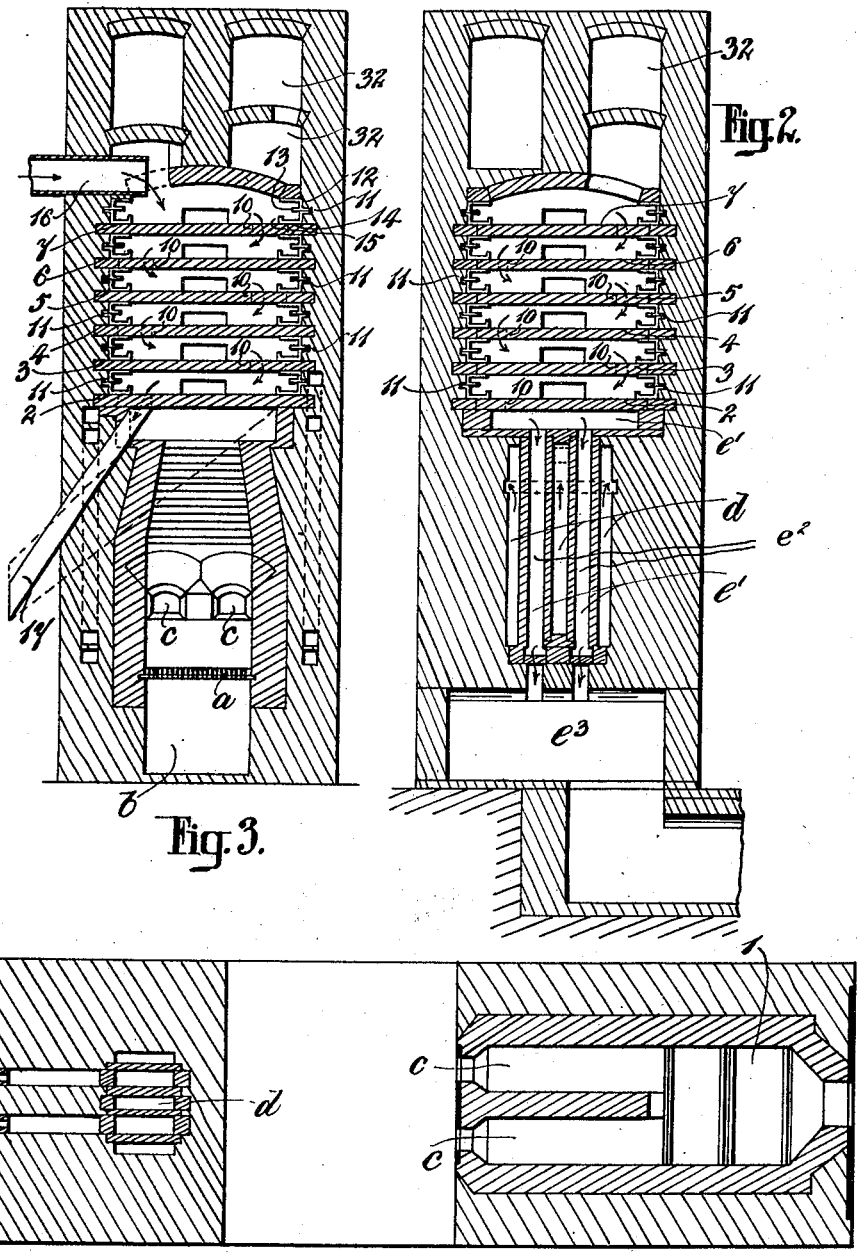

F. FOUARGE.
ROASTING FURNACE.
APPLICATION FILED APR. 24, 1917. RENEWED FEB. 4, 1920.
1,335,490.
Patented Mar. 30, 1920.
3 SHEETS—SHEET 3.
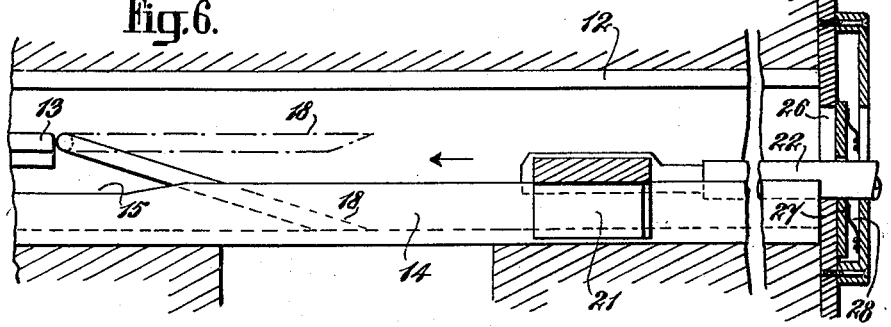
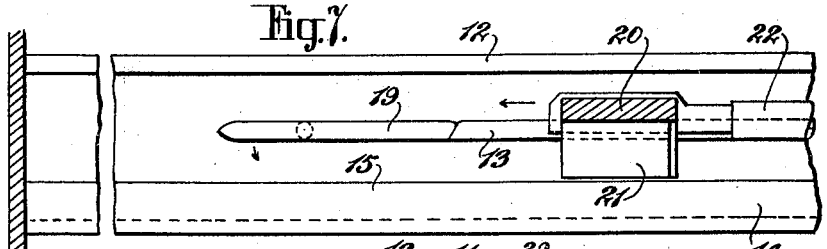
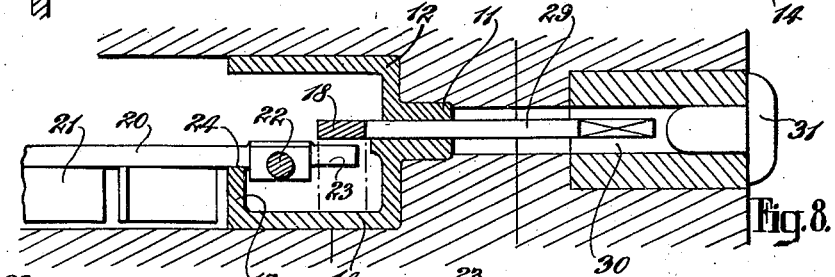
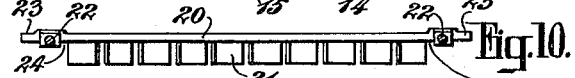
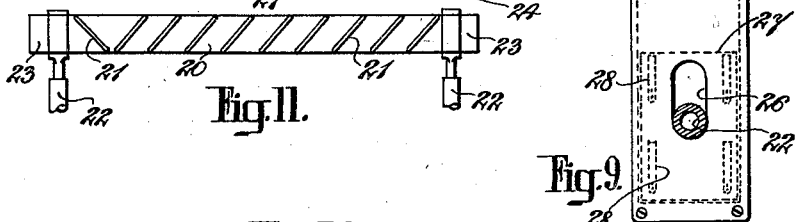
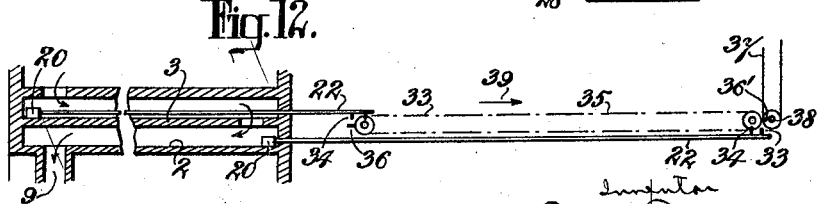

UNITED STATES PATENT OFFICE.

FRANZ FOUARGE, OF SWANSEA, WALES.

ROASTING-FURNACE.

1,335,490. Specification of Letters Patent. Patented Mar. 30, 1920.

Application filed April 24, 1917, Serial No. 164,200. Renewed February 4, 1920. Serial No. 356,118.

*To all whom it may concern:*

Be it known that I, FRANZ FOUARGE, a subject of the King of the Belgians, residing at 45 Sketty road, Swansea, Wales, have invented certain new and useful Improvements in and Relating to Roasting-Furnaces; and I do hereby declare the following to be a full, clear, and exact description of the invention, such as will enable others skilled in the art to which it appertains to make and use the same.

This invention relates to roasting furnaces, and refers to improvements in that type of such apparatus adapted to roast ores varying greatly in composition, such as those rich in sulfur, for example iron pyrites, and those poor in sulfur, for example Australian blend—in which a number of hearths are provided arranged one above another in stages and furnished with openings between the stages so that material fed on to the top hearth can pass along a sinuous path to the bottom hearth, the material being moved or pushed from hearth to hearth by means of rakes reciprocated backward and forward from the outside of the furnace, by rods, chains or the like, such rakes in some cases being carried by carriages or the like rolling upon rails in channels on each side of the furnace.

With apparatus of this description, as hitherto constructed, the rakes have been reciprocated backward and forward upon the surface of the hearths, an arrangement which has been found unsatisfactory in practice as even when the rakes are shaped so as to produce a greater movement of the ore or material under treatment, when the rake is moved in one direction, than when it is moved in the other, there is a liability to clog or jam the rakes and the most efficient results are not obtained.

The principal object of my invention is to obviate this difficulty.

And in order that my said invention may be better understood, I will now proceed to describe the same with reference to the drawing accompanying this specification, in which:—

Fig. 2 shows sectional side elevation taken on the line A B, Fig. 1;

Fig. 3 shows a similar view to Fig. 2, taken on the line G, H, Fig. 1;

Fig. 5 shows a similar view to Fig. 4, taken on a line C, D, Fig. 1;

Figs. 6–11 show details hereinafter referred to;

Fig. 12 is a diagrammatic view of one method of operating the furnace.

The same letters and numerals of reference are employed to denote the same parts in all the views:—

Figures 1, 4:
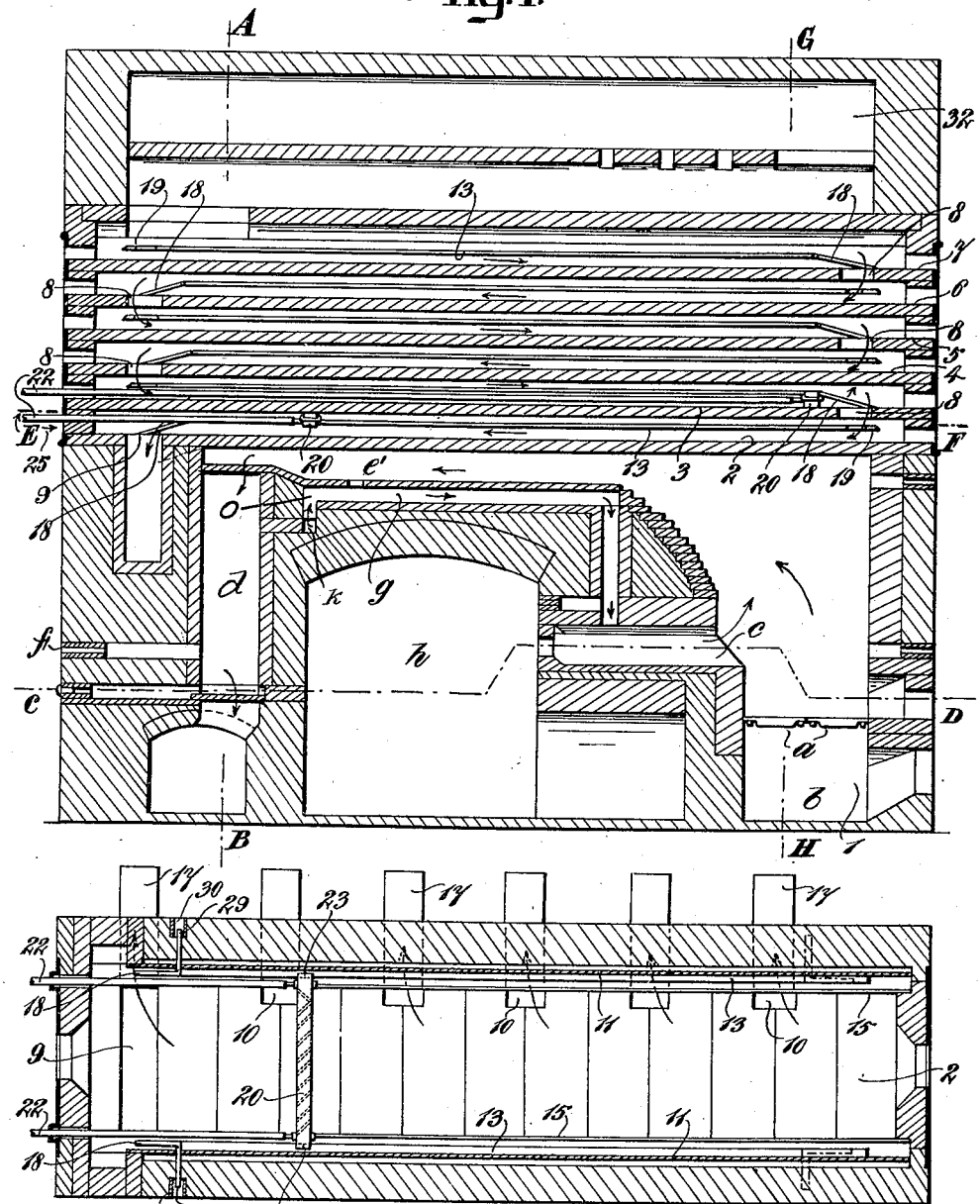
Figure 1 shows a longitudinal elevation of a furnace constructed according to my invention.
Fig. 4 shows a sectional plan on the lines E, F, Fig. 1.

At the lower portion of the furnace is located the combustion apparatus. This forms no part of the invention, and is of a type well-known in Belgium. The grate 1 is provided with bars $a$. $b$ is the ashpit. $c$ are coking chambers. $d$ are recuperating chambers. $e^1$, $e^2$, $e^3$, are the flue passages along which the heated products of combustion pass through the recuperator to the chimney, as indicated.

Air entering at $f$ passes to the chambers $d$ and thence through the passage $k$ (see Fig. 1) opening at each end through short vertical passages $o$ (see Fig. 1) and thence through ducts $g$ to the coking chambers as indicated by the arrows. With this arrangement, the coking chambers $c$ are charged alternately with fuel from the interior of the inner chamber or tunnel $h$, a thin layer of fuel being spread upon the lower surface of each chamber in such a way that while one chamber is being charged, the other is in full combustion. The fuel as it becomes converted into coke is pushed on to the grate $a$ where it is further burnt as will be readily understood.

2 is a slab or table coming above the combustion apparatus. 3, 4, 5, 6 and 7 are similar slabs arranged above the slab 2. 8 are apertures or openings in the ends of the slabs 2 to 7, the openings being so arranged that a sinuous path is formed from the top slab 7, through its aperture 8 along the slab 6 to its aperture 8 and so on to the slab 2 which is provided with an outlet 9.

The slabs 2 to 7 are also provided with apertures 10 at one side, the apertures 10 on one slab being arranged on the other side of the furnace to the apertures 10 on the slab above or below. 16 is a cylinder or entry orifice for material on to the top slab 7, and 17 are chutes to the outside of the furnace from the aperture 9 and apertures 10 in the bottom slab 2.

Slid or built in at the sides between the slabs are special shaped channel pieces 11 of metal. These comprise an upper member 12 having an inwardly projecting short flange 13 and a lower member 14 having an upwardly projecting ridge 15, see Figs. 6–8. The flange 13 is discontinued toward the ends and at one end is provided with a loosely pivoted flap 18, the lower end of which rests upon member 14. The other end is furnished with a pivoted portion 19, see Fig. 7, the pivot of which is so arranged that the weight of the flap keeps it normally in line with the flange 13.

As will be seen from Fig. 1, the flaps 18 and 19 on alternate slabs are in the reverse positions.

Figs. 10 and 11 show in front elevation and under plan a rabble arm or rake 20, provided on the underside with rakes or rabbles 21, arranged in an inclined manner as shown. 22 are long rods carrying the rabble which rabble is provided on the outside with projections 23, and also with spaces 24 coming just inside the rods 22. The rakes or rabbles 20 are of sufficient width to reach across from one channel 11 to the other, see Fig. 4.

On the lower slab 2, it will be seen from Fig. 4, that the projecting portions 23 rest upon the top of the flange 13 and upon pushing the arms 22 in the direction of the arrow 25 the rabble will be moved to the right, out of contact with the slab 2 until it reaches the flap 19. When it comes to the small arm of this flap and it is still pushed in the direction of the arrow, it will be lowered so that the portions 24 come to rest upon the ridges 15, when the flap 19 will fall back into position by its own weight. If now the arms 22 are pulled in the opposite direction, the rabble will move backward, but this time, with the portions 24 on the ridges 15, and consequently the rakes 21 will be in contact with the slab 2. This action will continue until the flap 18 is reached, when, upon still moving the rabble, the flap will be lifted until it clears the rabble, when it will drop back into position by its own weight. If now the arms 22 are again pushed in the direction of the arrow 25, the projecting portions 23 will ride up the flaps 18 and bring the rake or rabble with the projections 23 on the top of the flange 13 again clear of the slab 2. The arms 22 project through apertures in the sides of the furnace, but the vertical movement of the arms is allowed for by the elongated aperture 26, see Figs. 6 and 9, and the sliding spring pressed plate 27, kept over the aperture 26 by means of the springs 28.

Each slab 2 to 7 has its own operating rabble or rake with its arms 22 and the preferred arrangement is that these are worked in opposite directions. In this way, material fed on to the top slab from 16 is worked to the right and sidewise so that it falls through the aperture 8 and apertures 10 in the top slab 7 on to the slab 6. Here it is left for treatment for a time, while the rake or rabble is moving along on the top of the flange 13 of the slab, and upon the rake or rabble coming to the lower position and moving in the opposite direction the material is caused to move in a similar manner to that previously described through the aperture 8 and apertures 10 in the slab 6 on the slab 5, when the action is repeated.

At the same time, it should be realized that the different stages of the treatment are taking place on all of the slabs.

The spindles 29 of the flaps 18 can be operated from the outside of the furnace in a manner shown at Fig. 8, where it will be seen that the said spindles are located in an aperture 30 normally closed by a plug 31, the spindles being provided with squared ends by which they can be operated to test or adjust the positions of the flaps. If necessary, a similar fitting can be adapted to the flaps 19.

The general action of the furnace will be easily understood:—

The material being fed in at 16 is introduced just below the dust-chamber 32.

The material follows the course indicated by the arrows, while the gases given off move in the opposite direction and enter into the different compartments of the dust-chamber 32, from which they pass to be suitably utilized. The movement of the material on the even slabs or stages is opposite to that on the uneven slabs or stages. The even slabs or stages operate in unison as also the uneven stages.

One method of operating the arms 22 is shown in the diagram at Fig. 12, where the two stages represented by the slabs 2 and 3 are shown. The arms 22 or a connecting piece across each pair of arms carries projections 33 and 34. 35 is an endless belt or chain of suitable length which carries projections 36, $36^1$ in suitable positions. 37 is the main driving means provided with a pulley and clutch mechanism 38 of such a character that upon the passage in one direction of the projection $36^1$, the drive can be reversed. Taking the position of Fig. 12, if the belt or chain 35 moves in the direction of the arrow 39, the projection $36^1$ will come into contact with the projections 33 and the lower arms 22 will be moved to the left causing the rake 20 to be moved across the surface of the slab 2, at the same time the rake 20 will be moved to the right across the slab 3, each rake shifting the material on its slab so that it moves to its next stage. When the rakes reach the end of the slabs, they pass under and lift up the flaps 18 of their particular stage and when this is done, the parts are so arranged that the reversal of the driving clutch takes place and the endless band or chain 35 is now driven in the opposite direction. When this takes place, the projections 23 on the ends of the rakes ride up the inclined flaps 18 and the rakes pass across the furnace without operating when passing over the tipping flaps 19, after which the operation is repeated.

A furnace constructed as described possesses important advantages.

It can be used both for the treatment of ores rich in sulfur and for those poor in sulfur, which is not the case with the ordinary rabble furnace, it being only necessary to provide additional heat where ores poor in sulfur, such as Australian blends are being treated.

Owing to the construction of the furnace with the slabs forming the floors of the chambers resting between the metal channel pieces, in the event of a slab becoming damaged, it can be easily slid out or removed and a fresh one placed in position.

As the rods and associated parts are removed from the intense heat, there is no necessity to provide a water or other cooling circulation.

It will be understood that the particular construction of the furnace may be varied without departing from the principle of the same.

Other means may be provided for reciprocating the rabbles or rakes backward and forward in the chambers, provided that the movements of the said rabbles are effected at the proper times.

In some instances the rods or the like moving the rabble arms may be operated from opposite sides of the furnace at alternate stages, but in practice it is found more convenient to operate them from the same side. Other constructional details may be varied without departing from the principle of the invention.

What I claim and desire to secure by Letters Patent of the United States of America is:—

1. A roasting furnace comprising in combination, a plurality of chambers forming hearths arranged one above the other in stages, openings between the stages so located that material fed on to the top hearth can pass along a sinuous path to the bottom hearth, inwardly projecting flanges, located on the side walls of the said hearth, such flanges being discontinued toward each end of each hearth, rabble arms or rakes carried by rods or the like, extending across the hearths provided with means at their ends for enabling them to rest upon and slide upon the surface of the said flanges or to come below and slide below the said flanges, means for reciprocating the rabble arms or rakes from the outside of the furnace and means for causing the rake as it is reciprocated to ride up to the top of the inwardly projecting flanges at one end and to slide or drop down at the other end so that when moving in one direction, it passes along or in close proximity to the surface of the hearth, while when proceeding in the opposite direction, it is raised to a considerable height above such surface for the purposes set forth.

2. A roasting furnace comprising in combination a plurality of chambers formed by horizontal slabs, constituting hearths, openings between the hearths, so located that material fed on to the top hearth can pass along a sinuous path to the bottom hearth, cast metal channel pieces located between the slabs such channel pieces being provided with inwardly projecting flanged portions, located approximately midway between the slabs, such flanged portions being discontinued toward each end of each hearth, rabble arms carried by rods extending across the hearths and provided with means at their ends for enabling them to rest upon and slide upon the surface of the said flanged portions or to come below and slide below the said flanged portions, means for reciprocating the rabble arms from the outside of the furnace and means for causing the rabble arms as they are reciprocated to ride up to the top of the inwardly projecting flanged portions at one end and to slide down at the other end, so that when moving in one direction, they pass along in close proximity to the surface of the hearth while when proceeding in the opposite direction they are raised to a considerable height above such surface, all substantially as described.

3. A roasting furnace comprising in combination a plurality of chambers formed by horizontal slabs, constituting hearths, openings between the hearths, so located that material fed on to the top hearth can pass along a sinuous path to the bottom hearth, cast metal channel pieces located between the slabs such channel pieces being provided with inwardly projecting flanged portions, located approximately midway between the slabs, such flanged portions being discontinued toward each end of each hearth, rabble arms carried by rods extending across the hearths and provided with means at their ends for enabling them to rest upon and slide upon the surface of the said flanged portions or to come below and slide below the said flanged portions, means for simultaneously reciprocating the rabble arms for alternate hearths in opposite directions and means for causing the rabble arms as they are reciprocated to ride up to the top of the inwardly projecting flanged portions at one end and to slide down at the other end, so that when moving in one direction, they pass along in close proximity to the surface of the hearth while when proceeding in the opposite direction they are raised to a considerable height above such surface, all substantially as described.

In testimony whereof I affix my signature.

FRANZ FOUARGE.